US012696833B2

(12) United States Patent
Radeke et al.

(10) Patent No.: US 12,696,833 B2
(45) Date of Patent: Aug. 4, 2026

(54) METERING DEVICE FOR GRANULAR MATERIAL AND DISTRIBUTION MACHINE HAVING METERING DEVICE

(71) Applicant: Amazonen-Werke H. Dreyer SE & Co. KG, Hasbergen (DE)

(72) Inventors: Jan Philipp Radeke, Bassum (DE); Thomas Wien, Stuhr (DE)

(73) Assignee: AMAZONEN-WERKE H. DREYER SE & CO. KG, Hasbergen (DE)

( * ) Notice: Subject to any disclaimer, the term of this patent is extended or adjusted under 35 U.S.C. 154(b) by 69 days.

(21) Appl. No.: 18/666,038

(22) Filed: May 16, 2024

(65) Prior Publication Data

US 2024/0298566 A1　　Sep. 12, 2024

Related U.S. Application Data

(63) Continuation of application No. 17/432,441, filed as application No. PCT/EP2020/050956 on Jan. 16, 2020, now Pat. No. 12,052,946.

(30) Foreign Application Priority Data

Feb. 21, 2019　(DE) ..................... 10 2019 104 425.1

(51) Int. Cl.
　*A01C 7/12*　　　(2006.01)
　*G01F 11/24*　　(2006.01)
(52) U.S. Cl.
　CPC .............. *A01C 7/127* (2013.01); *A01C 7/125* (2013.01); *G01F 11/24* (2013.01)
(58) Field of Classification Search
　CPC ......... A01C 7/127; A01C 7/125; A01C 7/124; A01C 7/126; A01C 7/123; G01F 11/24
　See application file for complete search history.

(56) References Cited

U.S. PATENT DOCUMENTS

| | | | |
|---|---|---|---|
| 1,712,797 A | 5/1929 | Johnston et al. | |
| 2,698,704 A * | 1/1955 | Beasley | A01C 7/123 428/596 |

(Continued)

FOREIGN PATENT DOCUMENTS

| | | |
|---|---|---|
| DE | 102013005733 A1 | 10/2014 |
| DE | 102019104425 A1 | 8/2020 |

(Continued)

OTHER PUBLICATIONS

The foreign references and the NPLs are not submitted herewith as they can be retrieved in the U.S. Appl. No. 17/432,441, filed Aug. 19, 2021.

(Continued)

*Primary Examiner* — Donnell A Long
(74) *Attorney, Agent, or Firm* — Potomac Law Group, PLLC; John (Jack) J. Penny, Jr.

(57) ABSTRACT

The invention relates to a metering device (5) for granular material, in particular seeds and/or fertilizer, where the metering device (5) comprises a metering housing (9) having at least one inlet (8) and at least one outlet (11) for the granular material and two side walls (10) that are arranged spaced from one another, where a metering wheel (13) with end faces (13a) each pointing toward the side walls (10) is arranged between, firstly, the inlet (8) and, secondly, the outlet (11), and between the side walls (10), that are arranged spaced from one another, on a shaft and is connectable in a force-fit manner to the latter and can be driven to rotate by the shaft in a metering direction (D), where the metering wheel (13) is associated with blocking means (14) which are configured to block the metering wheel (13) against the transport of granular material in a direction opposite to the metering direction (D) from the inlet (8) to the outlet (11) and/or in the metering direction (D) from the outlet (11) to the inlet (8), and a plain wheel (15) is arranged at each end (Continued)

Figure 1:
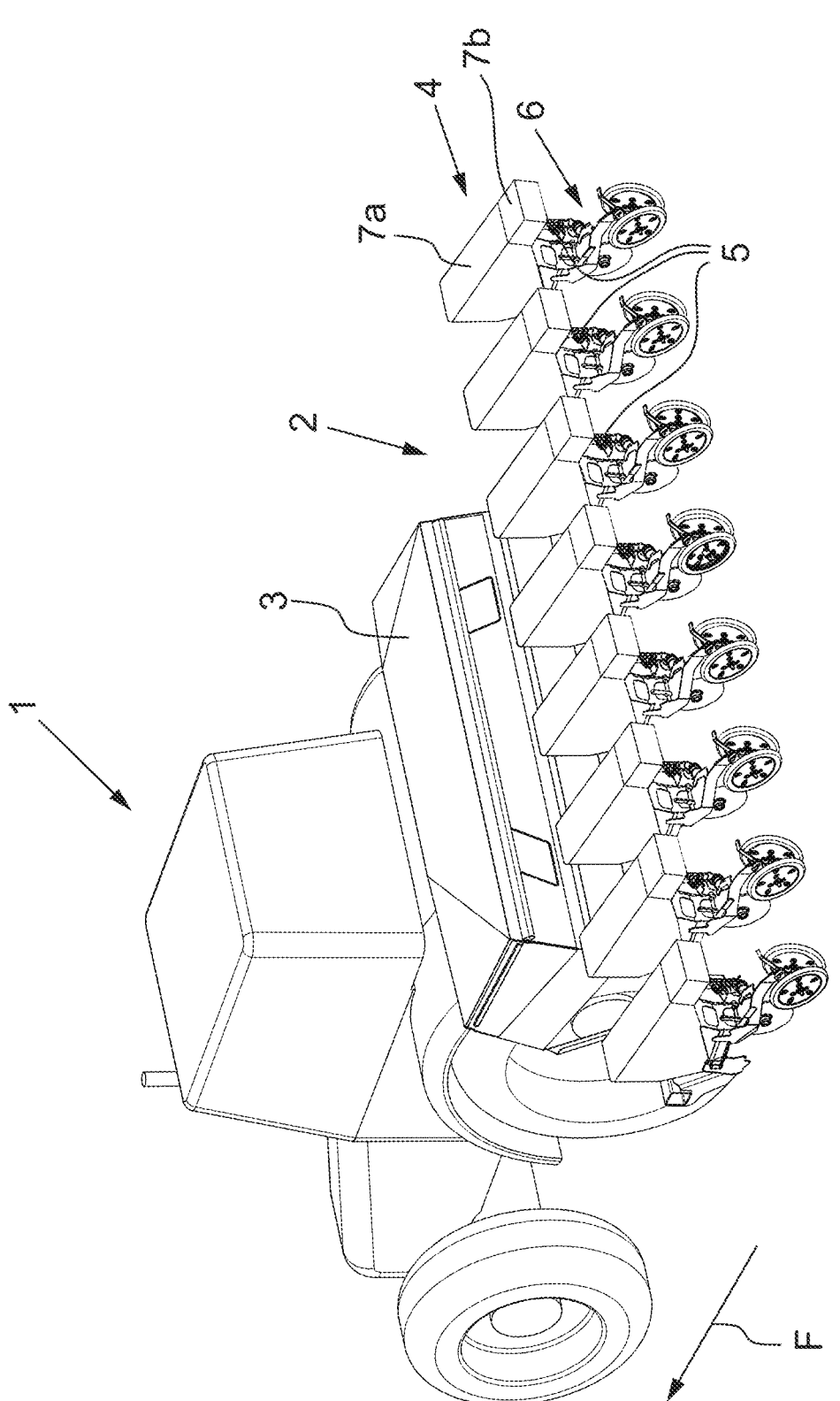

face (13*a*) of the metering wheel (13) and extends between the end face (13*a*) and the side wall (10) in an unfastened manner on the shaft, where a sealing element (16) is arranged on both sides between the respective end face (13*a*) of the metering wheel (13) and a side surface (15*a*) of the respective plain wheel (15) pointing toward this end face (13*a*).

18 Claims, 10 Drawing Sheets

(56) References Cited

U.S. PATENT DOCUMENTS

| | | | | |
|---|---|---|---|---|
| 2,757,825 A | | 8/1956 | Buhr | |
| 3,515,315 A | * | 6/1970 | Watson | A01C 7/084 |
| | | | | 406/182 |
| 4,131,221 A | | 12/1978 | Yeager | |
| 4,705,220 A | * | 11/1987 | Gandrud | A01C 7/123 |
| | | | | 239/654 |
| 4,793,523 A | * | 12/1988 | Bailey | A01C 7/087 |
| | | | | 222/317 |
| 4,928,858 A | * | 5/1990 | Tite | A01C 15/16 |
| | | | | 222/312 |
| 5,189,965 A | * | 3/1993 | Hobbs | A01C 15/04 |
| | | | | 111/178 |
| 5,325,800 A | * | 7/1994 | Wisor | A01C 7/046 |
| | | | | 221/211 |
| 5,549,060 A | * | 8/1996 | Schick | A01C 7/04 |
| | | | | 111/178 |
| 5,826,523 A | * | 10/1998 | Gregor | A01C 7/125 |
| | | | | 111/181 |
| 6,109,192 A | | 8/2000 | Foley et al. | |
| 6,158,630 A | | 12/2000 | Mayerle et al. | |
| 6,308,645 B1 | | 10/2001 | Newkirk et al. | |
| 8,166,895 B2 | | 5/2012 | Dean et al. | |
| 8,196,534 B2 | | 6/2012 | Meyer et al. | |
| 9,420,738 B2 | | 8/2016 | Walter | |
| 10,197,427 B2 | | 2/2019 | Henry | |
| 2004/0134400 A1 | | 7/2004 | Thiemke et al. | |
| 2008/0163807 A1 | | 7/2008 | Dean et al. | |
| 2016/0120109 A1 | | 5/2016 | Henry | |
| 2018/0263176 A1 | | 9/2018 | Boily | |

FOREIGN PATENT DOCUMENTS

| | | | |
|---|---|---|---|
| EP | 0772964 | A1 | 5/1997 |
| EP | 0927511 | A2 | 7/1999 |
| EP | 3146828 | A1 | 3/2017 |
| WO | 2020169277 | A1 | 8/2020 |

OTHER PUBLICATIONS

Office Action for Eurasian Patent Application No. 202191897/31, dated Dec. 1, 2022.

International Search Report and Written Opinion for PCT/EP2020/050956, dated Apr. 1, 2020.

* cited by examiner

METERING DEVICE FOR GRANULAR MATERIAL AND DISTRIBUTION MACHINE HAVING METERING DEVICE

This application is a continuation application of U.S. application Ser. No. 17/432,441, filed on Aug. 19, 2021, entitled "Metering Device For Granular Material And Distribution Machine Having Metering Device", a 35 U.S.C. 371 national stage filing of International Application No. PCT/EP2020/050956, filed on Jan. 16, 2020, which claims priority to German Application DE 10 2019 104 425.1, filed on Feb. 21, 2019, the contents of which are hereby incorporated by reference.

The invention relates to a metering device for granular material according to the preamble of claim 1 and a distribution machine according to the preamble of claim 15.

Such a distribution machine having a metering device is described in EP 3 146 828 B1. This distribution machine is used to spread seeds and/or fertilizer and for this purpose comprises a storage container for the granular materials, such as seeds or fertilizer. The storage container extends transverse to the direction of travel and comprises outlet openings arranged next to one another transverse to the direction of travel, each of which is associated with a metering device.

The metering device is used for dispensing granular material, i.e. seeds and/or fertilizer, in controlled quantities and comprises a metering housing which is open at the top and has two side walls that are arranged spaced from one another. The metering housing comprises an inlet, via which it is arranged at an outlet opening of the storage container, and an outlet, between which a metering wheel is arranged such that it can be driven to rotate on a shaft in a metering direction. The metering wheel has end faces pointing towards the side walls of the metering housing, where a respective plain wheel is arranged between the end faces and the side walls in an unfastened manner on the shaft. Furthermore, a sealing element is arranged between the end faces of the metering wheel and the side surfaces of the plain wheels facing the end faces.

During operation, the distribution machine is moved with the associated metering devices over agricultural areas and then experiences strong vibrations in some cases while the granular material trickles freely via the inlet onto the metering wheel. The vibrations or even moving the distribution machine on slopes can lead to the granular material accidentally being conveyed over the metering wheel in the direction opposite to the metering direction. This can lead to local overdosage, since too much granular material is dispensed by the metering devices, or the granular material is hurled out of the open housing at this metering device and distributed at an undesired location on the agricultural area.

After the distribution machine has been operated, small residual amounts of granular material typically remain in the metering housings of the metering devices and the distribution machine is made to assume the transport position. In the case of a distribution machine that is foldable at least in part, in the transport position, parts of the machine are folded up to an upright position or even folded over to a lying position rotated by approximately 180 degrees. The disadvantage of the above-described metering device is that, in the position that is rotated at least in part, it is not configured to prevent residual quantities remaining in the metering housing from escaping undesirably, since granular material can trickle through the metering housing without being held back. The granular material in this metering device would be dumped out of the open housing in a particularly disadvantageous manner. This metering device consequently exhibits inadequate metering accuracy, especially on slopes and/or uneven terrain, and is unsuitable for use on machines that are folded at least in part.

A further metering device is known from U.S. Pat. No. 9,420,738 B2. This metering device comprises several metering wheels, which are arranged between two side walls spaced from one another on a shaft and can be connected thereto in a force-fit manner, and each of which is separated from one another by plain wheels that are arranged in an unfastened manner on the shaft. The disadvantages mentioned in relation to the metering device described above also apply to this metering device, namely that the metering accuracy is in some cases insufficient and it is not suitable for use on folded machines. Furthermore, this metering device has no sealing elements between the metering wheel and the plain wheels, as a result of which there is a risk that grains will jam there. Jammed grains further reduce the metering accuracy and can increase the required drive power should otherwise stationary plain wheels be co-driven by jammed grains. In the worst case, this can lead to a halt of the entire metering device.

Furthermore, U.S. Pat. No. 6,158,630 A describes a metering device in which the plain wheels are associated with a metering wheel such that they can be driven together in rotation by the shaft. This is disadvantageous since increased drive power is necessary for this.

The object on which the invention is based is to create a metering device which has increased metering accuracy and functional reliability.

This object is satisfied by the features of claims 1 and 15. Advantageous further developments of the invention are mentioned in the dependent claims. All combinations of at least two features specified in the description, the claims, and/or the figures also fall within the scope of the invention.

The metering housing can be configured to be closed. The metering wheel can be connected in a force-fit manner to the shaft, i.e. can be made to assume a drive connection, for example, by way of a switchable coupling or a positive-fit connection of the metering wheel on the shaft. The filling member comprising the plain wheels limits the motion of the metering wheel on the shaft in the axial direction of the shaft towards the side wall of the metering housing. The plain wheels therefore serve as an axial guide for the metering wheel. In addition, the filling member surrounds the metering wheel in such a way that granular material can be transported from the inlet to the outlet only in the region of the metering wheel. In this respect, the plain wheels seal the metering housing between the inlet and the outlet such that granular material is only conveyed in the region of the metering wheel. The plain wheels are arranged in an unfastened manner on the shaft, i.e. they are not positively driven by the shaft. When the metering device is in operation, the metering wheel is driven to rotate while the plain wheels are stationary. The filling member with the at least two plain wheels can be formed integrally, where the metering wheel preferably has a shortened hub and is able to be clicked in between the plain wheels subject to brief elastic deformation.

The invention also makes use of the knowledge that the effect of gravity can be insufficient to ensure that granular material is only transported along the metering wheel in the metering direction. The effect of gravity for the correct transportation of the granular material in the metering device is weakened during operation by vibrations and/or slopes or, in the case of machines that are foldable at least in part, acts in different directions in the operating and transport position.

The fact that the metering wheel is associated with blocking means configured to block the metering wheel against the transportation of granular material in a direction opposite to the metering direction from the inlet to the outlet and/or in the metering direction from the outlet to the inlet cancels at least approximately the influence of gravity upon the correct transportation of the granular materials. The blocking means can abut resiliently against the metering wheel and sweep thereover in the metering direction during operation. The advantage there is that granular material can be delivered from the outlet only via the rotating metering wheel, i.e. is at least approximately prevented in all positions from automatically exiting the metering housing via the outlet. Similar to the principle of a mechanical freewheel in a direction opposite to the metering direction, the blocking means can engage with the metering wheel in a positive-fit manner between the sealing elements, so that granular material in the region of the metering wheel can be transported only in the metering direction. In a particularly advantageous manner, this prevents granular material from being conveyed over the metering wheel in a direction opposite to the metering direction due to vibrations or the like. In particular, the metering housing is divided by the blocking means into a conveying region which in the metering direction extends along the metering wheel from the inlet to the outlet and a non-conveying region which in the metering direction extends from the outlet to the inlet or in a direction opposite to the metering direction from the inlet to the outlet, respectively.

The sealing elements respectively arranged between the end face of the metering wheel and the side surface of the plain wheel also significantly reduce the risk of grains jamming within the metering device, in particular between stationary and driven components, i.e. the plain wheels and the metering wheel. The sealing elements can serve as wear parts between the metering wheel and the plain wheels, i.e., it is provided for reducing wear on the metering wheel and/or the plain wheels that the sealing elements are configured such that they wear out in a selective manner at least approximately instead of the metering wheel and/or the plain wheels. As a wear part, the sealing elements can act like a sacrificial component between the metering wheel and the plain wheels. It is advantageous there to have the sealing elements reduce the torque arising between the metering wheel and the plain wheels and thereby reduce the drive power required.

In an advantageous further development of the metering device, it is provided that the sealing element is configured as an at least approximately semicircular sheet metal part, where the sheet metal part extends like a segment of a circle from the inlet in the direction of rotation of the metering wheel toward the outlet between the side surface of the respective plain wheel and the end face of the metering wheel. This further development is based on the idea that, in particular due to the locking devices, the metering wheel comes into contact with granular material almost exclusively in the direction of rotation of the metering wheel, i.e. in the metering direction, between the inlet and the outlet. Without risking grains jamming, the torque arising and the drive power required can therefore be further reduced due to the minimized contact surface between the sealing element and the metering wheel in that the sealing element is configured as an approximately semicircular sheet metal part.

It is provided in an alternative advantageous further development of the metering device that the sealing element is configured as a ring-shaped sheet metal part, where the sheet metal part extends in engagement around said shaft in a circular manner between the side surface of the respective plain wheel and the end face of the metering wheel. The advantage of this further development is that, due to the sealing element being configured as a ring-shaped sheet metal part, the metering wheel is guided along its circumference by the sealing element. This results in improved concentricity of the metering wheel and reliable axial guidance of the metering wheel on the shaft. This further development is consequently characterized by increased operational reliability due to the improved concentricity of the metering wheel and the additionally reduced risk of grains getting jammed between the plain wheels and the metering wheel.

In a further particularly advantageous further development of the metering device, the ring-shaped sheet metal part comprises a recess in the region of the outlet from the metering housing, where the metering device is configured by way of the recess to eject granular material that is jammed between the sheet metal part and the end face of the metering wheel. Material jammed between the metering wheel and the sheet metal part is rolled at least approximately along a circular path when the metering device is in operation. The recess creates an interruption in this circular path, so that the jammed material is released from the rolling contact in the region of the outlet and drops into the outlet. The operational reliability of the metering device is advantageously increased as a result of this measure.

The metering device is also advantageously further developed in that the plain wheels each comprise a recess in the region of the outlet from the metering housing, where the metering device is configured by way of at least one recess to eject granular material that is jammed between the plain wheel and the end face of the metering wheel. The recess increases the distance between the plain wheel and the metering wheel in the region of the outlet, so that any jammed material drops out and is fed to the outlet. This is advantageous for the operational reliability of the metering device.

In a further advantageous embodiment of the invention, at least one plain wheel comprises a, preferably resilient, spring element acting in the direction of the side walls between the sealing element and the side surface facing the sealing element. Each plain wheel preferably comprises a spring element. The spring element can have a spring travel of at least 1 mm. The spring element can be used to compensate for dimensional and positional tolerances of the metering device, in particular of the metering housing, the metering wheel, the plain wheels, and/or the sealing elements in that it holds the sealing element securely in abutment against the face side of the metering wheel and the plain wheel in abutment against the side wall of the metering housing. As a result of this measure, the tightness of the entire assembly is increased and the mounting and operational reliability is improved.

It is provided in a further particularly advantageous embodiment of the invention that the spring element is configured as a ring-shaped foam member, where the foam member extends in engagement around said shaft in a circular manner between the side surface of the plain wheel and the sealing element. The sealing element is held by the ring-shaped foam member in a simple manner securely in abutment over the entire circumference of the metering wheel against the latter and the plain wheel is pressed against the side wall of the metering housing at least approximately over the entire surface. The axial alignment of the components arranged on the shaft is then improved in a simple manner.

A particularly expedient arrangement of the metering device is created in that the metering wheel is arranged at least approximately in the middle between the side walls that are arranged spaced from one another. The metering device can be configured to be symmetrical at least in part, so that identical parts can be used to the right and to the left of the middle i.e. of the metering wheel. The manufacturing costs of the metering device are then reduced in a simple manner.

It is provided in a further advantageous development of the metering device that the sealing elements and/or the plain wheels comprises devices by way of which the sealing elements are fastened in a positive-fit manner to the respective plain wheel. In this way, it is prevented in a simple manner that the sealing elements are set in rotation by frictional contact with the metering wheel and are then co-driven Furthermore, contact conditions thus defined between the metering wheel and the sealing element are created which can advantageously be taken into account when designing the components, in particular the sealing elements as wear partners.

In order to reduce the contact area between the metering wheel and the sealing elements, it is provided in a further advantageous development of the metering device that the end faces of the metering wheel are trough-shaped. This further development is consequently characterized by a particularly reduced torque requirement or a reduced drive power demand.

The metering device is also advantageously further developed in that the metering wheel is at least approximately as wide as a plain wheel. This results in an advantageous ratio of 2:1 between the conveying region and the plain region for the unit consisting of the metering wheel and the plain wheels arranged on both sides.

In a further advantageous embodiment of the metering device, the filling member comprising the at least two plain wheels is formed integrally. Formed integrally, meaning made as one part. The filling member only by way of example can be a plastic member produced by injection molding. The number of individual parts is then advantageously reduced and an assembly step is saved. The filling member can be formed to be resilient at least in part, so that the metering wheel can be inserted into the filling member between the plain wheels and can be removed from the filling member. As a result of this measure, it is also advantageous that the metering wheel is guided particularly securely between the plain wheels.

In another advantageous further development of the metering device, the metering wheel and the sealing elements, the plain wheels and/or the at least one spring element have an almost identical outer diameter. The outer diameter of the metering wheel is measured at the outer diameter of conveying elements, such as blades, possibly arranged on the outer surface of the metering wheel. As a result of this further development, the metering device is configured in a simple manner to be particularly tight, so that granular material is conveyed almost only in the region of the metering wheel by rotation of the latter. The granular material can therefore be metered out particularly precisely by controlling the drive of the metering wheel.

In a further advantageous embodiment, the blocking means comprise at least one elastic sealing lip. The elastic sealing lip can be arranged in abutment against the metering wheel so that it sweeps over the metering wheel. The transportation of granular material in a direction opposite to the metering direction is then almost completely blocked. The undesired escape of material is then prevented and the metering accuracy is increased.

It is provided in a further likewise advantageous embodiment that the blocking means comprise at least one brush element. The brush element can comprise bristles that sweep over the metering wheel. It is there advantageous that the metering wheel is additionally cleaned by the blocking means formed as a brush element. During operation, dust and other particles are swept off the metering wheel by the brush element, which increases the metering accuracy.

The object of the invention is also satisfied by a distribution machine of the type mentioned at the outset, where the metering device is configured according to at least one of the above embodiments. With regard to the advantages of the distribution machine, reference is made to the advantages of the various embodiments of the metering device.

Further details of the invention can be gathered from the description of the examples and the drawings. The drawings are showing in FIG. 1 a distribution machine formed as a single grain sower arranged behind an agricultural tractor in a perspective view, FIG. 2 a metering device with a closed metering housing in a perspective view, FIG. 3 the metering device according to FIG. 2, where the metering housing is open and reveals a first embodiment of a metering wheel in a perspective view, FIG. 4 the metering wheel removed from the metering housing according to FIGS. 2-3 in a perspective view, FIG. 5 the metering wheel according to FIGS. 2-4 in an exploded view, FIG. 6 the metering wheel according to FIGS. 2-5 in a cross-sectional view, FIG. 7 the metering wheel according to FIGS. 2-6 in a longitudinal sectional view, FIG. 8 a second embodiment of a metering wheel removed from a metering housing in perspective view, FIG. 9 the metering wheel according to FIG. 8 in an exploded view, and FIG. 10 the metering wheel according to FIGS. 8-9 in a longitudinal sectional view.

A distributing machine configured as a single grain sower 2 arranged behind an agricultural tractor 1 can be seen in FIG. 1. Single grain sower 2 in direction of travel F at its front end comprises a storage container 3 for seeds and/or fertilizer and at its rear end a plurality of sowing units 4 arranged side by side transverse to direction of travel F. Storage container 3 saddled onto the frame of single grain sower 2 is formed to be funnel-shaped and at its lower end comprises outlet openings which are covered by sowing units 4 and each of which is associated with a metering device 5 for granular material. The number of outlet openings or metering devices 5, respectively, in this single grain sower 2 corresponds to the number of sowing units 4, where one respective metering device 5 is configured to dispense material stored in storage container 3 in metered quantities and is connected to a sowing unit 4 via dispensing lines (not shown). In this way, fertilizer and/or seeds from storage container 3 can additionally be distributed to sowing units 4.

It is also conceivable that storage container 3 comprises a number of outlet openings with metering devices 5 that differs from the number of sowing units 4. In the event that there are more metering devices 5 than sowing units 4 present on single grain sower 2, it is conceivable that one sowing unit 4 is supplied by more than one metering device 5 and/or at least one metering device 5 is switched off or the associated outlet opening is closed by a shut-off valve 6. In the event that there are more sowing units 4 present than metering devices 5 on single grain sower 2, it is conceivable that one metering device 5 supplies several sowing units 4 with material. A split dispensing line can be used only be way of example for this purpose.

Sowing units 4 are arranged side by side transverse to direction of travel F on a frame of single grain sower 2 and each carry two material tanks 7a, 7b, a first material tank 7a preferably for seeds, and a second material tank 7b preferably for seeds and/or fertilizer. First material tank 7a is connected to a concealed separating device for the individual delivery of seeds for distributing the seeds on an agricultural area during operation. A metering device 5 is likewise associated to second material tank 7b, which can also be referred to as a micro-granulate tank, for dispensing the stored material.

Figure 2:
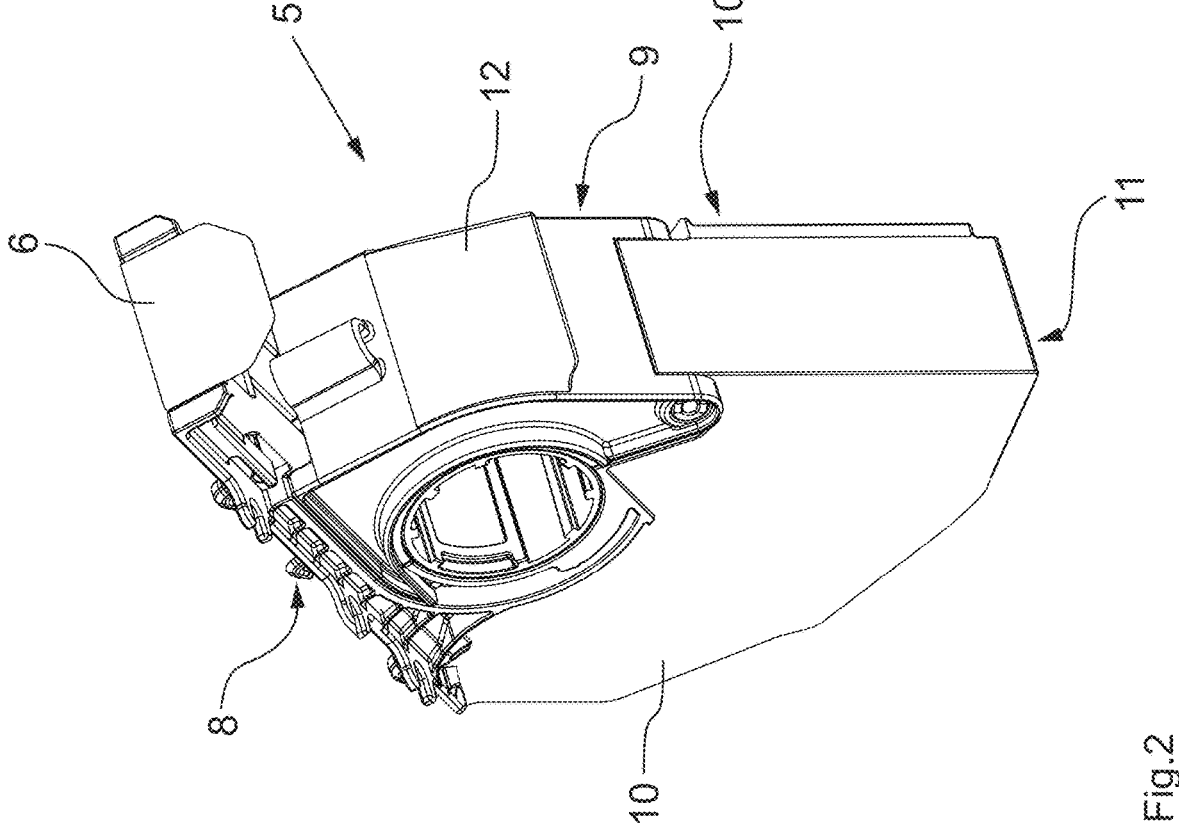

Such a metering device 5, as is used on storage container 3 and on second material tank 7b, can be seen in FIG. 2 in a view isolated from single grain sower 2. Metering device 5 is arranged via shut-off valve 6 to an outlet opening of storage container 3 or material tank 7b. Shut-off valve 6 can be moved at least between a closed and an open position, so that granular material can enter metering device 5 via an inlet 8. Metering device 5 comprises a closed metering housing 9. Metering housing 9 is also formed substantially by two mutually spaced, oppositely disposed side walls 10 between which an outlet 11 extends at the lower end, and a housing flap 12. A dispensing line can adjoin outlet 11 so that the material delivered by metering device 5 is distributed at the desired location.

Figure 3:
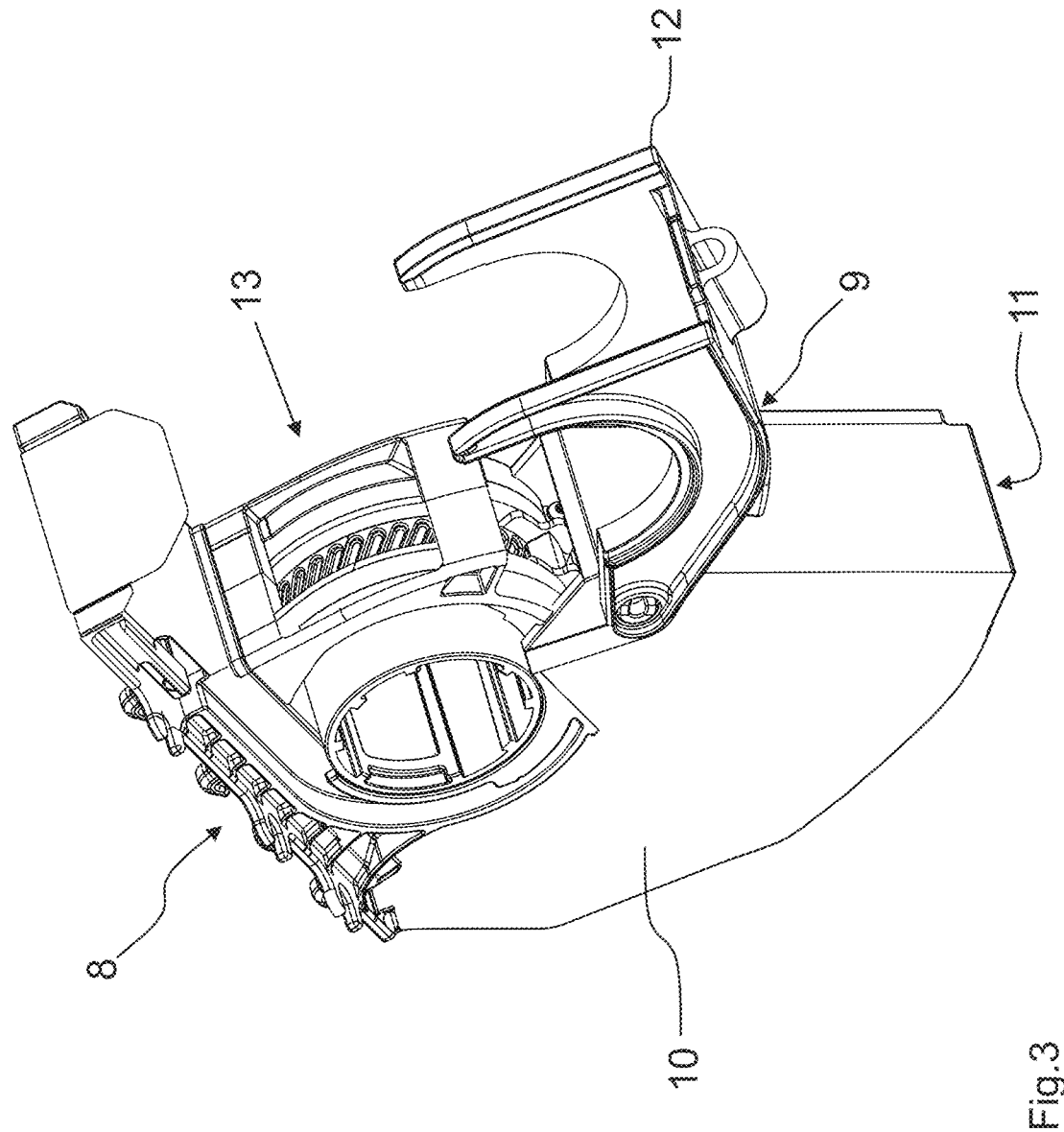

Housing flap 12 can be folded down about a pivot axis so that metering housing 9 is open and reveals a view onto a first embodiment of a metering wheel 13, as shown in FIG. 3. In this position, metering wheel 13, which is arranged between inlet 8 and outlet 11 and at least approximately in the middle between side walls 10 that are arranged spaced from one another, can be removed from metering housing 9. FIGS. 2-7 show a first embodiment of metering wheel 13, where metering wheel 13 is shown in a view removed from metering housing 9 in FIGS. 4-7. A second embodiment of metering wheel 13 can be seen in FIGS. 8-10 in a position removed from metering housing 9.

Metering wheel 13 comprises end faces 13a facing side walls 10 and, in the position installed in metering housing 9, is arranged on a shaft, not shown, to which it can be connected in a force-fit manner. For this drive connection to the shaft, metering wheel 13 comprises a hub 13b and can then be driven to rotate in a metering direction D. Metering wheel 13 is further associated with blocking means 14 which are configured to block metering wheel 13 against the transportation of granular material in a direction opposite to metering direction D from inlet 8 to outlet 11 and in metering direction D from outlet 11 to inlet 8. Disposed to the right and the left of metering wheel 13, more precisely on each end face 13a of metering wheel 13, is a plain wheel 15 which extends between the respective end face 13a and the respective side wall 10 of metering housing 9. Plain wheels 15 together form a so-called filling member and thereby fill the space between metering wheel 13 and side walls 10 within metering housing 9 at least approximately, so that granular material is guided exclusively at least approximately in the region of metering wheel 13 from inlet 8 to outlet 11 through metering housing 9. Plain wheels 15 are arranged in an unfastened manner on the shaft, not shown, so that they are not co-driven when metering wheel 13 is in rotation. In the present embodiments, the filling member is configured in two parts. Plain wheels 15 can be releasably fastened and plugged together to form the filling member. In an embodiment not shown, the filling member is formed integrally, i.e. is made as one piece.

A sealing element 16 is likewise arranged on both sides of metering wheel 13 between respective end face 13a and a side surface 15a of respective plain wheel 15 facing this end face 13a. In this first embodiment of metering wheel 13, sealing element 16 is configured as a ring-shaped sheet metal part and extends in engagement around said shaft in a circular manner between side surface 15a of plain wheel 15 and end face 13a of metering wheel 13.

Sealing element 16 is intended to prevent granular material from jamming between driven metering wheel 13 and stationary plain wheels 15 and is arranged rotationally fixed on plain wheel 15 in a positive-fit manner by way of devices formed on plain wheel 15 as an antirotation 15b lock by way of fastening grooves 16b on sealing element 16 and corresponding devices engaging in fastening grooves 16b. When metering device 5 is in operation, sealing element 16 is consequently at a standstill. Should individual grains nevertheless get jammed between metering wheel 13 and a plain wheel 15, then sealing element 16, which is presently configured as a ring-shaped sheet metal part, comprises a recess 16a in the region of outlet 11 from metering housing 9. The otherwise flat, circular contact between sealing element 16 and end face 13a of metering wheel 13 is interrupted by recess 16a so that space is locally exposed for jammed material and metering device 5 is configured by way of recess 16a to eject granular material that is jammed between sealing element 16 and end face 13a.

Figure 4:
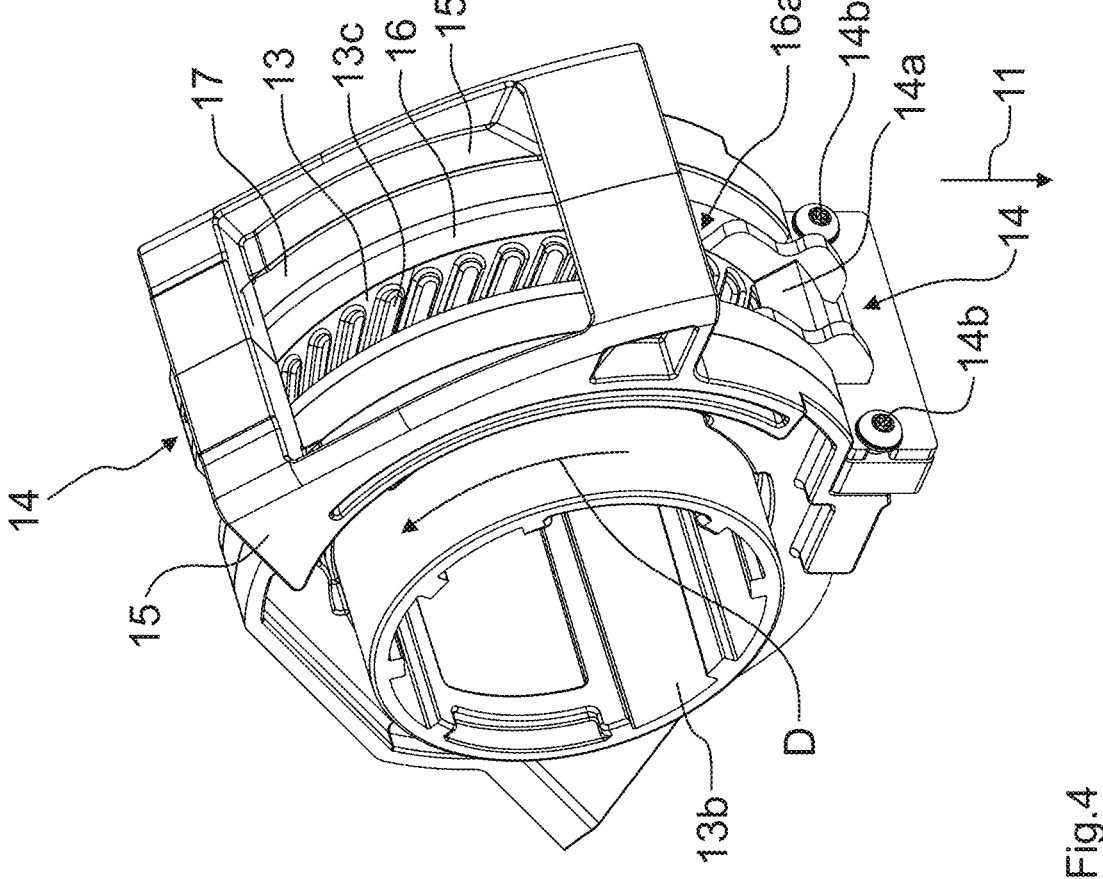
Figure 5:
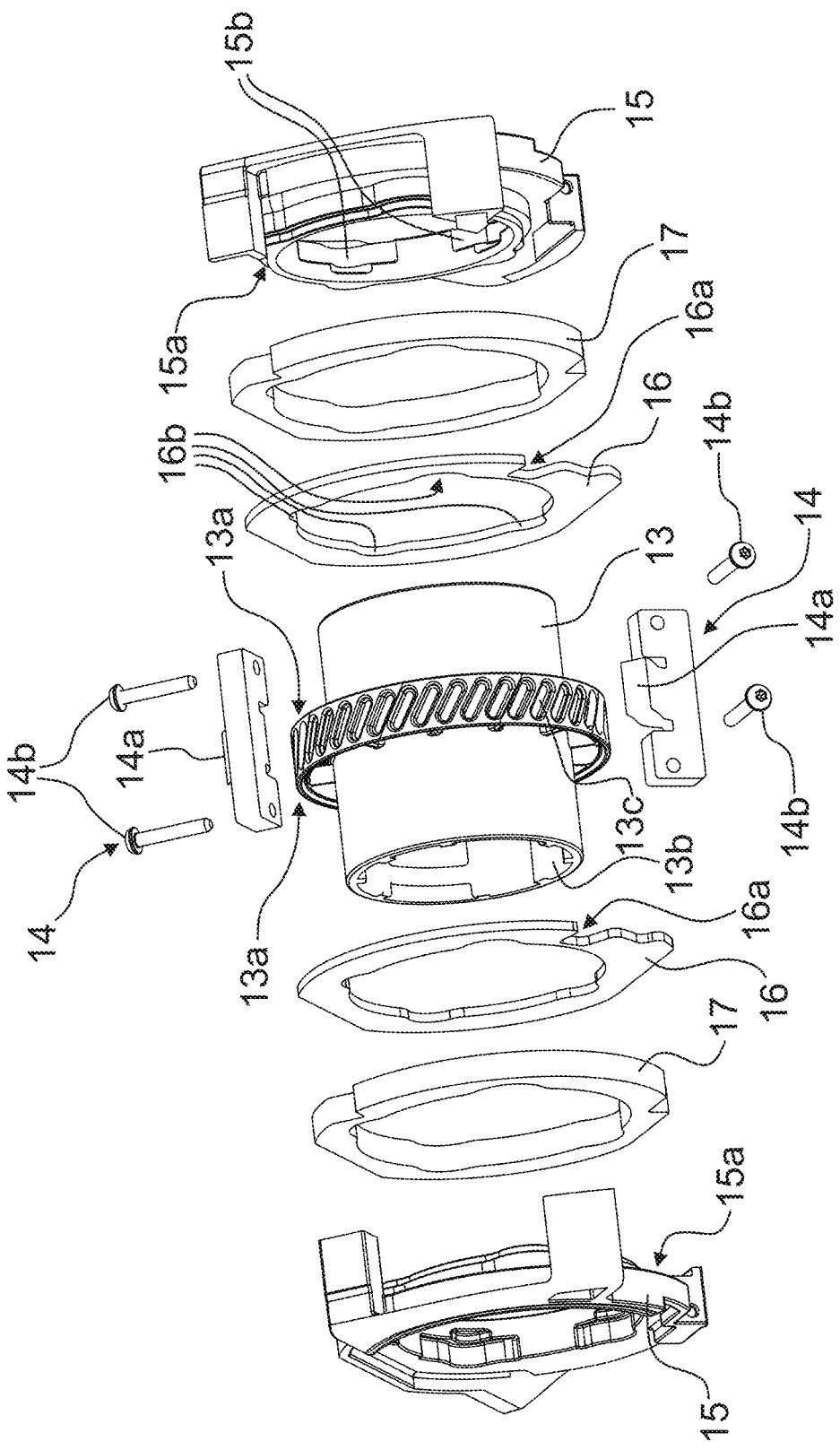
Figure 6:
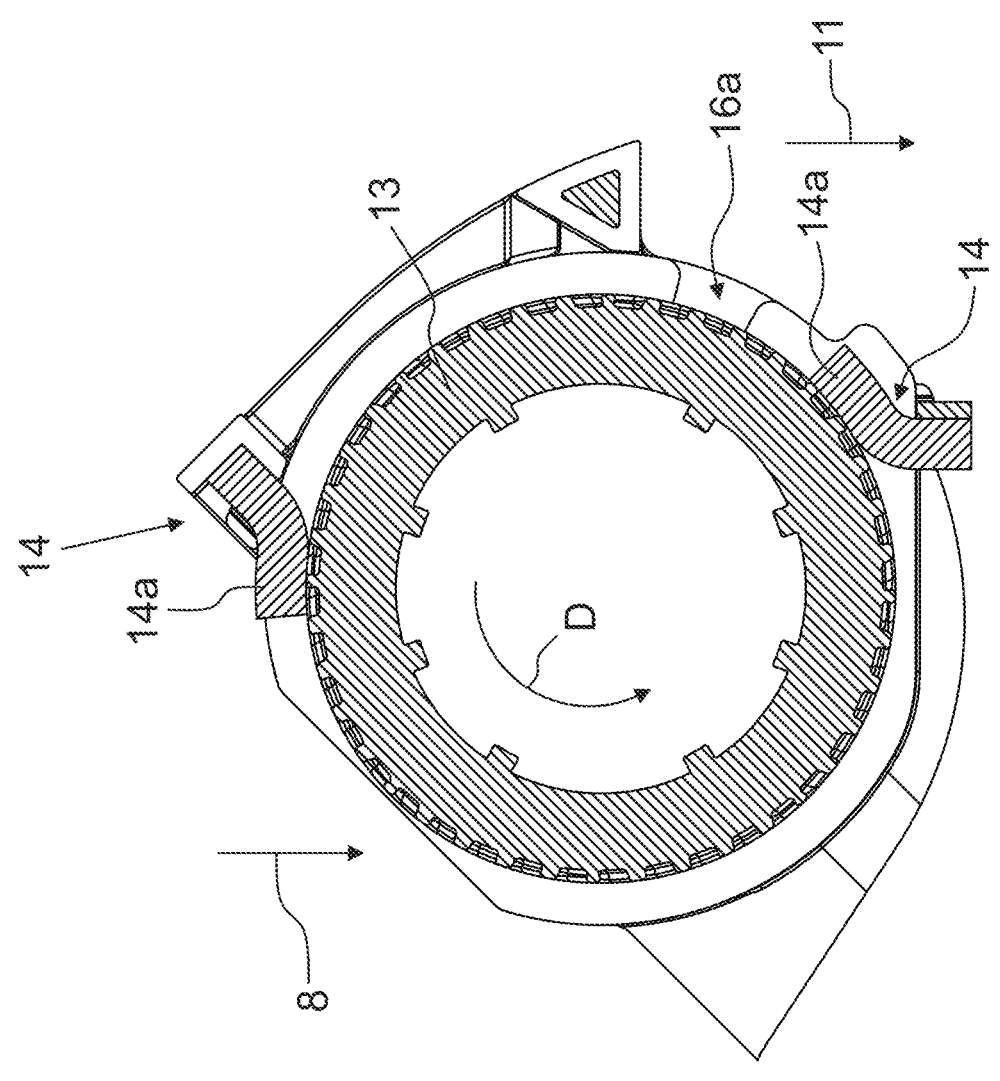

Blocking means 14, provided to prevent the unintentional escape of granular material from metering device 5, are arranged in the region of inlet 8 on the upper side of metering wheel 13 and in the region of outlet 11 on the lower side of metering wheel 13 and comprise an elastic sealing lip 14a. In an embodiment not shown, blocking means 12 can alternatively or additionally comprise at least one brush element. As the cross-sectional view of metering wheel 13 in FIG. 6 shows, sealing lips 14a nestle flexibly against metering wheel 13. In the region of inlet 8, granular material is prevented from being transported from inlet 8 to outlet 11 in a direction opposite to metering direction D, both when metering wheel 13 is stationary and when it is driven in metering direction D. In the region of outlet 11, sealing lip 14a likewise nestles flexibly against metering wheel 13 and then prevents granular material from being transported in metering direction D from outlet 11 to inlet 8 when metering wheel 13 is stationary. When metering wheel 13 is driven, the granular material is entrained in and/or between conveying elements 13c arranged on the outer surface of metering wheel 13 in the wedge between sealing lip 14a and metering wheel 13 and, after passing through between metering wheel 13 and sealing lip 14a, trickles into outlet 11. Provided for fastening blocking means 14 are two respective screws 14b with which the former can be affixed in bores provided on plain wheels 15, as shown in FIGS. 4 and 5.

In order to enable simple assembly of metering device 5, in particular metering wheel 13, a spring element 17 configured as a ring-shaped foam member, in particular a foam spring, is arranged between sealing element 16 and side surface 15a of two plain wheels 15 facing sealing element 16. Spring element 17, presently configured as a ring-shaped foam member, engages around the shaft, not shown, in a circular manner and extends between side surface 15a of respective plain wheel 15 and respective sealing element 16. Spring element 17 acts in the direction of side walls 10 and has a spring travel of at least approximately one millimeter so that sealing element 16 is held by way of spring element 17 securely in abutment against end face 13a of metering wheel 13. The first embodiment of metering wheel 13 can be seen in a longitudinal sectional view in FIG. 7. Due to the fact that plain wheels 15 abut against side walls 10 and spring element 17 is supported on side surface 15a of plain wheels 15 and acts in this direction, sealing element 16 is held in an elastically resilient manner, as described above, in abutment against respective end face 13a of metering wheel 13. The sealing of metering wheel 13 is thus improved and fewer grains jam between metering wheel 13 and sealing element 16. Furthermore, spring element 17 compensates for manufacturing tolerances of the components arranged on the shaft (not shown), namely metering wheel 13, plain wheels 15, and sealing elements 16, in that spring element 17 is either compressed or expanded. The assembly of metering device 5 and in particular of metering wheel 13 is thereby particularly facilitated.

Figure 7:
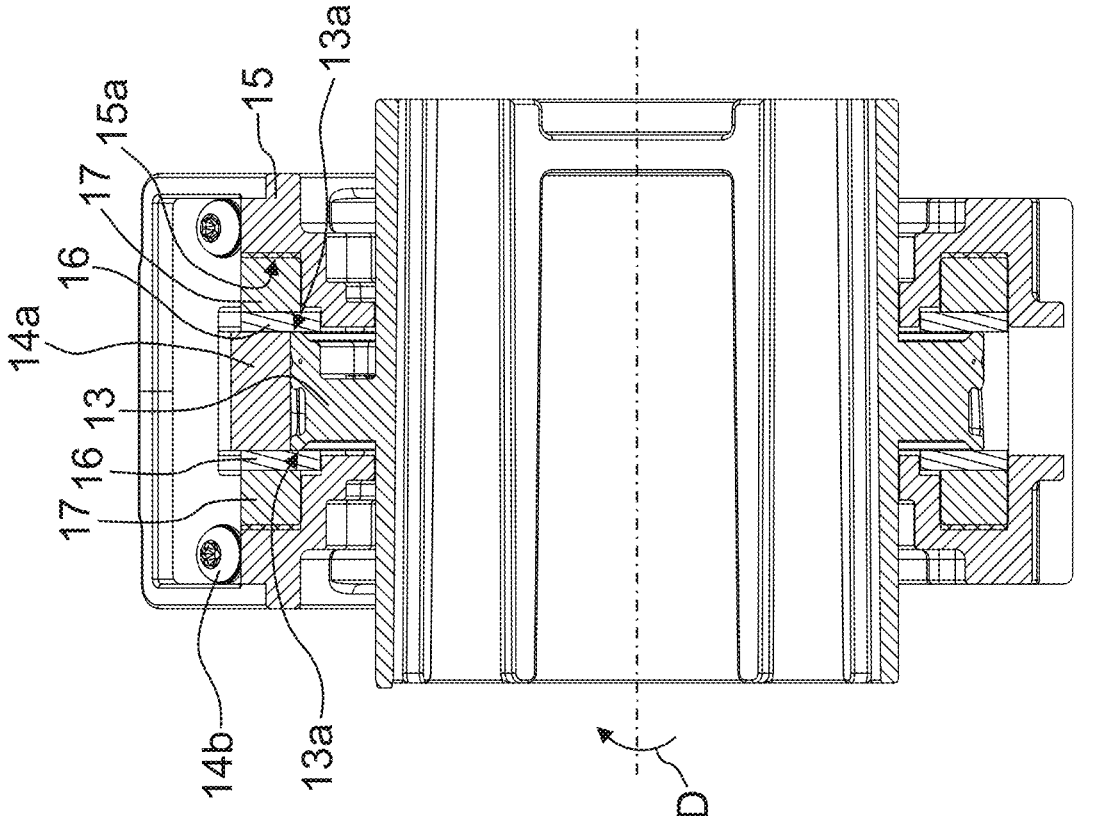

As FIG. 7 also shows, end faces 13a of metering wheel 13 are trough-shaped. A particularly small friction surface then arises between end face 13a and adjacent sealing elements 16 transverse to metering direction D during operation, i.e. to the rotational motion of metering wheel 13. Firstly, this reduces the torque required to drive metering wheel 13 and, secondly, defined contact conditions arise between metering wheel 13 and sealing element 16 which allow sealing element 16 to act as a sacrificial component for metering wheel 13. The material combination of metering wheel 13 and sealing element 16 is selected such that sealing element 16 wears first, i.e. serves as a wear partner This has the advantage that metering wheel 13 has to be replaced less often in the course of regular maintenance work than sealing element 16, where sealing element 16 is very inexpensive to obtain. As a result, maintenance costs are saved in a simple manner.

Figure 8:
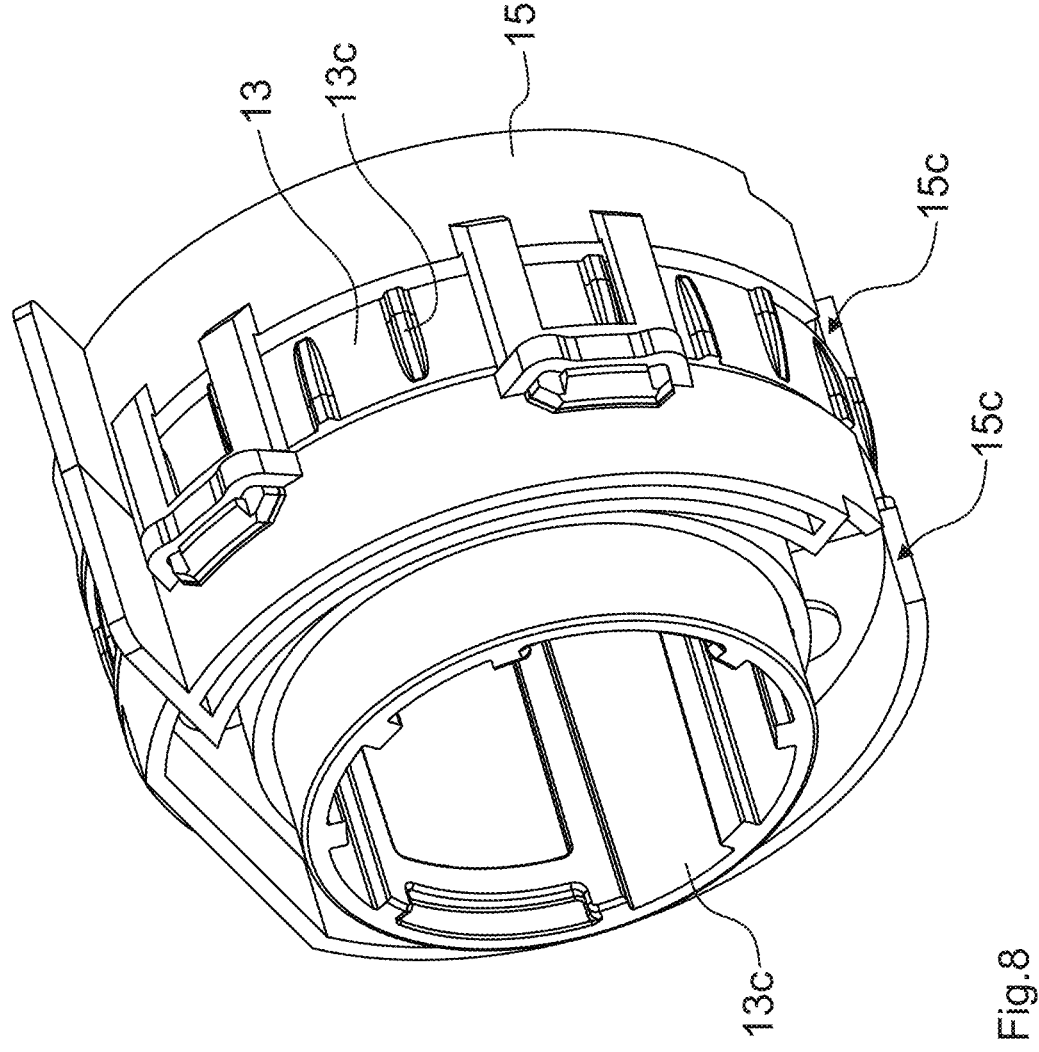
Figure 9:
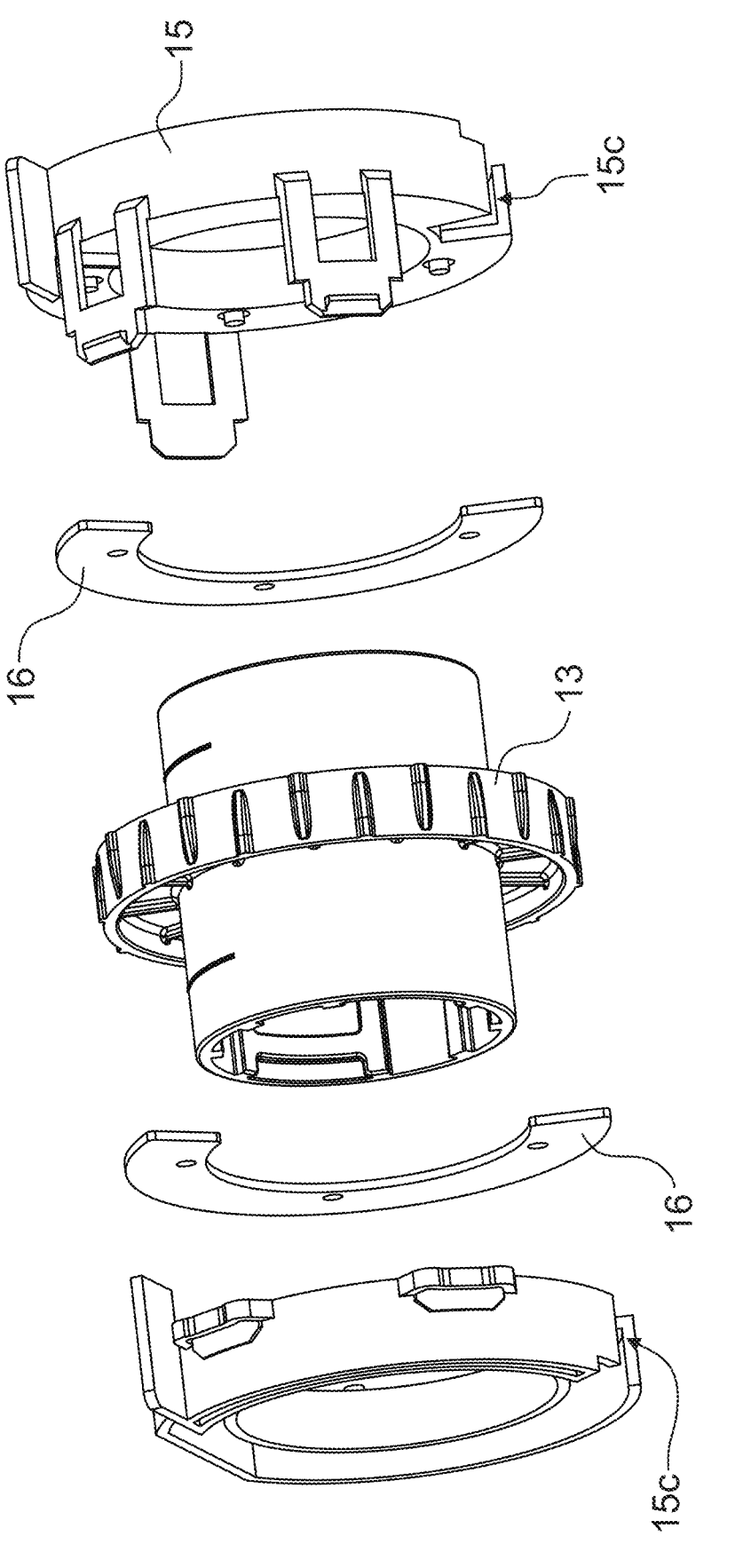
Figure 10:
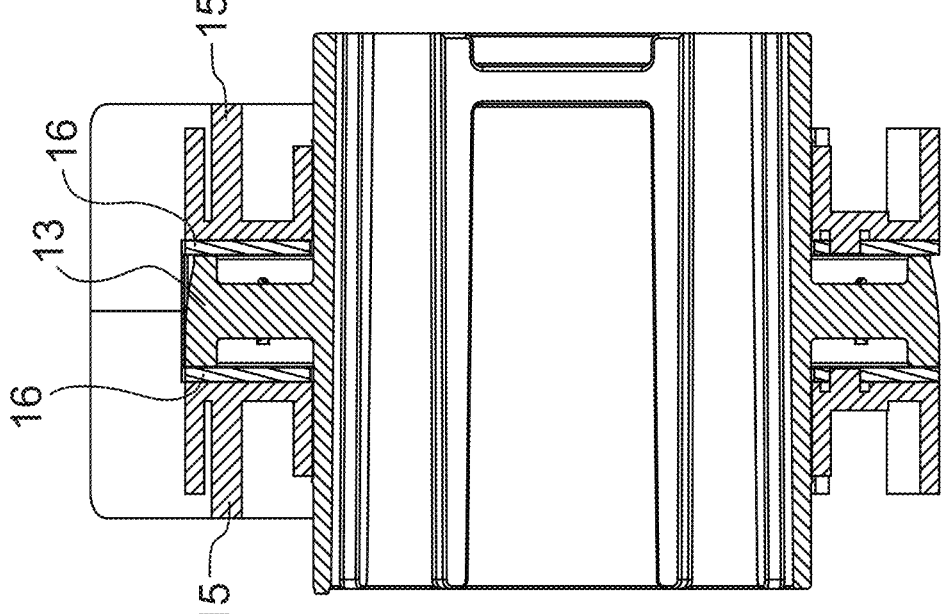

A second embodiment of metering wheel 13 can be seen in FIGS. 8-10 in a position removed from metering housing 9. Parts with the same effect are denoted with the same reference numerals as in the first embodiment. This metering wheel 13 is also associated with a plain wheel 15 and a respective sealing element 16 on both sides, as shown in FIG. 8. Sealing elements 16 are affixed in a positive-fit manner on plain wheels 15 and both parts are stationary when metering wheel 13 is in rotational operation by way of hub 13c.

The second embodiment of metering wheel 13 is shown in an exploded view in FIG. 9. In this embodiment, sealing elements 16 are configured as an at least approximately semicircular sheet metal part and extend from inlet 8 in the direction of rotation of metering wheel 13, i.e. metering direction D, in the shape of a segment of a circle to outlet 11 between side surface 15a of respective plain wheel 15 and end face 13a of metering wheel 13. This embodiment has the advantage that there is even less friction created between metering wheel 13 and sealing elements 16, since they extend substantially only over the part of the circumference of metering wheel 13 in which the granular material is transported.

In order to prevent grains from jamming between metering wheel 13 and plain wheel 15, plain wheels 15 are each provided with a recess 15c in the region of outlet 11 from metering housing 9. Recesses 15c create an enlarged spacing between metering wheel 13 and respective plain wheel 15, so that metering device 5 is configured by way of recesses 15c to eject any granular material that is jammed between respective plain wheel 15 and end face 13a of metering wheel 13.

As FIG. 10 as well as FIG. 7 further show, metering wheel 13 is at least approximately as wide as one of plain wheels 15. Furthermore, metering wheel 13 and sealing elements 16, as well as plain wheels 15, have an almost identical outer diameter. Spring elements 17 of first embodiment also have an outer diameter at least approximately identical to plain wheels 15, sealing elements 16, and metering wheel 13, as shown in FIG. 7.

LIST OF REFERENCE CHARACTERS

1 agricultural tractor
2 single grain sower
F direction of travel
3 storage container
4 sowing assembly
5 metering device
6 shut-off valve
7a,b material tank
8 inlet
9 metering housing
10 side walls
11 outlet
12 housing flap
13 metering wheel
13a face end
13b hub
13c conveying element
D metering direction
14 blocking means
14a sealing lip
14b screw
15 plain wheel
15a side surface
15b antirotation lock
15c recess
16 sealing element
16a recess
16b fastening groove
17 spring element
The invention claimed is:

1. A metering device for granular material, in particular seeds and/or fertilizer, wherein said metering device comprises a metering housing having at least one inlet and at least one outlet for said granular material and two side walls that are arranged spaced from one another, and a metering wheel with end faces each pointing toward said side walls is arranged between, firstly, said inlet and, secondly, said outlet, and between said side walls, which are arranged spaced from one another, on a shaft and is connectable in a force-fit manner to the latter and can be driven to rotate by said shaft in a metering direction, wherein said metering wheel is associated with blocking means which are configured to block said metering wheel against the transport of granular material in a direction opposite to said metering direction from said inlet to said outlet and/or in said metering direction from said outlet to said inlet, and said metering device comprises a filling member comprising at least two plain wheels arranged in an unfastened manner on said shaft, wherein a plain wheel is arranged at each end face of said metering wheel and extends between said end face and said side wall, wherein a sealing element is arranged on both sides between said respective end face of said metering wheel and a side surface of said respective plain wheel pointing toward this end face, and wherein said metering wheel said sealing elements and said plain wheels have an almost identical outer diameter.

2. The metering device according to claim 1, wherein said plain wheels each comprise a recess in the region of said outlet from said metering housing, and wherein said metering device is configured by way of at least one recess to eject granular material that is jammed between said plain wheel and said end face of said metering wheel.

3. A distribution machine for spreading seeds and/or fertilizer comprising a storage container for seeds and/or fertilizer and at least one metering device associated with an outlet opening of said storage container, wherein said metering device is formed according to claim 2.

4. The metering device according to claim 1, wherein at least one plain wheel comprises a spring element acting in the direction of said side walls between said sealing element and said side surface facing said sealing element.

5. The metering device according to claim 4, wherein said spring element is configured as a ring-shaped foam member, said foam member extends in engagement around said shaft in a circular manner between said side surface of said plain wheel and said sealing element.

6. A distribution machine for spreading seeds and/or fertilizer comprising a storage container for seeds and/or fertilizer and at least one metering device associated with an outlet opening of said storage container, wherein said metering device is formed according to claim 4.

7. The metering device according to claim 1, wherein said metering wheel is arranged at least approximately in the middle between said side walls that are arranged spaced from one another.

8. The metering device according to claim 1, wherein said sealing elements and/or said plain wheels comprise devices by way of which said sealing elements are fastened in a positive-fit manner to said respective plain wheel.

9. The metering device according to claim 1, wherein said end faces of said metering wheel are trough-shaped.

10. The metering device according to claim 1, wherein said filling member comprising said at least two plain wheels is formed integrally.

11. The metering device according to claim 1, wherein said metering wheel, said sealing elements and said at least one spring element have an almost identical outer diameter.

12. The metering device according to claim, 1, wherein said blocking means comprise at least one elastic sealing lip.

13. The metering device according to claim 1, wherein said blocking means comprise at least one brush element.

14. A distribution machine for spreading seeds and/or fertilizer comprising a storage container for seeds and/or fertilizer and at least one metering device associated with an outlet opening of said storage container, wherein said metering device is formed according to claim 1.

15. A distribution machine for spreading seeds and/or fertilizer comprising a storage container for seeds and/or fertilizer and at least one metering device associated with an outlet opening of said storage container, wherein said metering device is formed according to claim 1.

16. The metering device according to claim 1, wherein said sealing element is configured as a ring-shaped sheet metal part, and said sheet metal part extends in engagement around said shaft in a circular manner between said side surface of said respective plain wheel and said end face of said metering wheel.

17. A distribution machine for spreading seeds and/or fertilizer comprising a storage container for seeds and/or fertilizer and at least one metering device associated with an outlet opening of said storage container, wherein said metering device is formed according to claim 16.

18. A metering device for granular material, in particular seeds and/or fertilizer, wherein said metering device comprises:

a metering housing having at least one inlet and at least one outlet for said granular material and two side walls that are arranged spaced from one another; and a metering wheel with end faces each pointing toward said side walls, said metering when being arranged between, firstly, said inlet and, secondly, said outlet, and between said side walls, which are arranged spaced from one another, on a shaft and is connectable in a force-fit manner to the latter and can be driven to rotate by said shaft in a metering direction, wherein said metering wheel is associated with blocking means which are configured to block said metering wheel against the transport of granular material in a direction opposite to said metering direction from said inlet to said outlet and/or in said metering direction from said outlet to said inlet, wherein said metering device comprises a filling member comprising at least two plain wheels arranged in an unfastened manner on said shaft, wherein a plain wheel is arranged at each end face of said metering wheel and extends between said end face and said side wall, wherein a sealing element is arranged on both sides between said respective end face of said metering wheel and a side surface of said respective plain wheel pointing toward this end face, wherein said plain wheels each comprise a recess in the region of said outlet from said metering housing, and wherein said metering device is configured by way of at least one recess to eject granular material that is jammed between said plain wheel and said end face of said metering wheel.

* * * * *